United States Patent
Payne et al.

(10) Patent No.: US 8,256,401 B2
(45) Date of Patent: Sep. 4, 2012

(54) ALTERNATE FUEL STORAGE SYSTEM AND METHOD

(75) Inventors: Edward A. Payne, Greensboro, NC (US); Rodger Karl Williams, Siler City, NC (US)

(73) Assignee: Immixt, LLC, Siler City, NC (US)

( * ) Notice: Subject to any disclaimer, the term of this patent is extended or adjusted under 35 U.S.C. 154(b) by 1094 days.

(21) Appl. No.: 11/748,022

(22) Filed: May 14, 2007

(65) Prior Publication Data
US 2007/0277794 A1 Dec. 6, 2007

Related U.S. Application Data

(60) Provisional application No. 60/747,811, filed on May 21, 2006.

(51) Int. Cl.
*F02M 31/16* (2006.01)
(52) U.S. Cl. ........... 123/557; 123/549
(58) Field of Classification Search ........ 123/543–557, 123/575–577
See application file for complete search history.

(56) References Cited

U.S. PATENT DOCUMENTS

| | | | |
|---|---|---|---|
| 2,911,958 A | | 11/1959 | Griep |
| 3,913,543 A | * | 10/1975 | Richard .......... 123/552 |
| 4,323,046 A | * | 4/1982 | Barber ........... 123/575 |
| 4,413,604 A | | 11/1983 | Tune |
| 4,471,744 A | * | 9/1984 | Holtz ............. 123/514 |
| 4,572,133 A | * | 2/1986 | Bago ............. 123/431 |
| 4,712,516 A | * | 12/1987 | Eberhardt ....... 123/1 A |
| 4,865,005 A | * | 9/1989 | Griffith ......... 123/546 |
| 4,964,376 A | * | 10/1990 | Veach et al. .... 123/557 |
| 5,105,063 A | * | 4/1992 | Hockemier ..... 219/205 |
| 5,237,978 A | | 8/1993 | Bailey |
| 5,245,953 A | | 9/1993 | Shimada et al. |
| 5,271,370 A | | 12/1993 | Shimada et al. |
| 5,336,396 A | | 8/1994 | Shetley |
| 5,450,832 A | | 9/1995 | Graf |
| 5,505,177 A | | 4/1996 | Herdin et al. |
| 5,662,090 A | * | 9/1997 | Ward ............. 123/557 |
| 5,775,308 A | * | 7/1998 | Headley ......... 123/549 |
| 5,911,210 A | | 6/1999 | Flach |
| 6,016,457 A | | 1/2000 | Toukura et al. |
| 6,035,837 A | | 3/2000 | Cohen et al. |

(Continued)

FOREIGN PATENT DOCUMENTS
DE 4131626 A1 3/1993
(Continued)

OTHER PUBLICATIONS

"Frybrid Diesel/Vegetable Oil," available at http://www.frybrid.com/frybrid.htm, Aug. 23, 2005, 2 pages.

(Continued)

*Primary Examiner* — Marguerite McMahon
(74) *Attorney, Agent, or Firm* — Withrow & Terranova, PLLC

(57) ABSTRACT

A fuel tank for storing an alternate fuel and providing the fuel to an internal combustion engine includes: an inner shell with an internal cavity designed to store fuel; an outer shell configured and positioned relative to the inner shell such that an interstitial volume is created between the inner and outer shells; and a heating unit positioned in the interstitial volume. In some embodiments, the interstitial volume is filled with air; in other embodiments, the interstitial volume is filled with a thermally insulative material.

21 Claims, 10 Drawing Sheets

U.S. PATENT DOCUMENTS

| | | | |
|---|---|---|---|
| 6,112,151 A | 8/2000 | Kruse | |
| 6,145,494 A | 11/2000 | Klopp | |
| 6,260,539 B1 | 7/2001 | Minowa et al. | |
| 6,370,472 B1 | 4/2002 | Fosseen | |
| 6,668,804 B2 | 12/2003 | Dobryden et al. | |
| 6,687,597 B2 | 2/2004 | Sulatisky et al. | |
| 6,698,387 B1 | 3/2004 | McFarland et al. | |
| 6,839,619 B2 | 1/2005 | Bellinger | |
| 6,957,542 B1 * | 10/2005 | Kido et al. | 62/3.2 |
| 7,044,103 B2 | 5/2006 | May | |
| 7,107,942 B2 | 9/2006 | Weissman et al. | |
| 7,353,810 B1 * | 4/2008 | Blaschke | 123/549 |
| 7,640,913 B2 | 1/2010 | Blumberg et al. | |
| 2002/0011491 A1 * | 1/2002 | Rosen et al. | 220/4.14 |
| 2005/0072384 A1 | 4/2005 | Hadley et al. | |
| 2007/0119429 A1 * | 5/2007 | Jacquay | 123/557 |

FOREIGN PATENT DOCUMENTS

| | | |
|---|---|---|
| DE | 19823335 A1 | 12/1999 |
| DE | 19922748 A1 | 11/2000 |
| DE | 10217664 A1 | 11/2003 |
| EP | 1790839 A2 | 5/2007 |
| JP | 2003065094 | 3/2003 |
| JP | 2004190935 | 7/2004 |
| WO | 2006005930 A2 | 1/2006 |

OTHER PUBLICATIONS

"Greasecar Vegetable Fuel Systems," available at http://greasecar.com/product_detail.cfm, Aug. 23, 2005, 2 pages.

* cited by examiner

ALTERNATE FUEL STORAGE SYSTEM AND METHOD

RELATED APPLICATION

This application claims priority to U.S. Provisional Patent Application No. 60/747,811, filed May 21, 2006, the disclosure of which is hereby incorporated herein in its entirety.

FIELD OF THE INVENTION

The present invention relates to fuel systems for internal combustion engines and more particularly to fuel systems that provide an alternate fuel to an internal combustion engine.

BACKGROUND OF THE INVENTION

For a variety of reasons, most of which relate to environmental and alternative energy pursuits, certain primary fuel engines, such as diesel engines, can be made to accommodate alternate fuels, such as straight vegetable oil (SVO), "biodiesel," and other fuel oils (hereinafter "alternate fuels"). However, practical applications have demonstrated that alternate fuel should be heated up to a temperate that will allow it to easily pass through the fuel delivery system. Likewise, if left in a storage tank to cool, the alternate fuel has a tendency to increase in viscosity, congeal or solidify within fuel storage components. Thus, the alternate fuel should not be used until it has reached an appropriate temperature. As a result, these systems typically exhibit a delay required to heat the alternate fuel and must run on diesel fuel until the alternate fuel is at a usable viscosity, effectively forfeiting utilization of the alternate fuel while consuming diesel.

Recently, heating of the alternate fuel has been accomplished by co-opting a conventional fuel storage vessel and diverting a portion of engine coolant in close proximity to said storage vessel to effect heat transfer from the engine coolant. While functional, this method suffers multiple performance and efficiency limitations. As one primary example, the storage vessel and the alternate fuel therein continually loose appreciable heat energy to the surrounding atmosphere. This has the effect of rapidly promoting congealment and solidification of the alternate fuel if the engine is turned off, thereby requiring a reheat cycle and corresponding delay upon the vehicle's next use, and again the consumption of diesel fuel during this period. Also, with heat energy being continuously lost, the efficiency of the heating process itself is reduced; thus, the time required to heat is increased. In colder climates, the effect of heat energy loss worsens, heating delay increases, and the consumption of diesel fuel likewise increases. Similarly, weather phenomena such as snow or rain, or water splash upon the storage vessel, can result in heat energy loss, potentially to such degree as to overcome the heat energy provided by the diverted engine coolant, thus yielding a net decrease in alternate fuel temperature and the risk of congealment or solidification of the alternate fuel while in use.

Another performance and efficiency limitation occurs if the initial temperature of the engine coolant is lower than the initial temperature of the alternate fuel. Upon engine start and the initiation of coolant flow, the heat transfer process will instead occur in reverse, with any latent heat energy within the alternate fuel being removed by the engine coolant. The First Law of Thermodynamics dictates that any heat energy removed must again be replaced just to regain the initial alternate fuel temperature prior to cold engine start, so heating delay is further increased and the consumption of diesel fuel likewise increased.

Yet another limitation arises from the heat energy source used to control alternate fuel viscosity being the engine coolant itself, which results in the system being dependent upon running the engine on diesel or primary fuel for a period of time sufficient to heat the engine coolant before the alternate fuel becomes usable and available to the engine.

Therefore, an improved system and method of alternate fuel storage are desired.

SUMMARY OF THE INVENTION

As a first aspect, embodiments of the present invention are directed to a fuel tank for storing an alternate fuel and providing the fuel to an internal combustion engine. The fuel tank comprises: an inner shell with an internal cavity designed to store fuel; an outer shell configured and positioned relative to the inner shell such that an interstitial volume is created between the inner and outer shells; and a heating unit configured and positioned to transfer heat energy to fuel stored within the inner shell. In some embodiments, the interstitial volume is filled with a gas; in other embodiments, the interstitial volume is filled with at least one thermally insulative material.

As a second aspect, embodiments of the present invention are directed to a fuel tank for storing an alternate fuel and providing the fuel to an internal combustion engine, comprising: an inner shell with an internal cavity designed to store fuel; an outer shell configured and positioned relative to the inner shell such that an interstitial volume is created between the inner and outer shells; and a heating unit configured and positioned to transfer heat energy to fuel stored within the inner shell. The heating unit, inner shell and outer shell are mounted on a common mounting structure. In some embodiments, the assembly includes one, two or three of a fuel level sensor, a fuel viscosity sensor, and a fuel temperature sensor.

DETAILED DESCRIPTION OF EMBODIMENTS OF THE INVENTION

Figure 1:
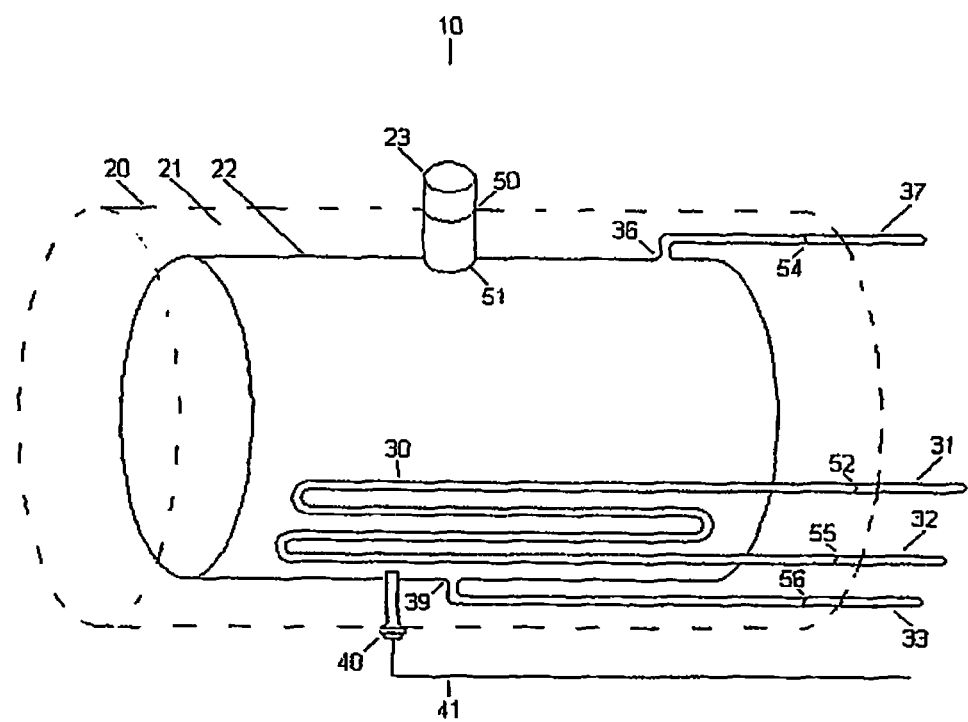
FIG. 1 is a perspective view of a fuel storage system according to embodiments of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The present invention provides a fuel storage system that can generally be used as an easily adaptable solution for the storage of alternate fuels whose tendency is to congeal or solidify if left within fuel storage and delivery components. For purposes of description within the accompanying drawings, fuel is presumed delivered by pressure pump, suction pump or gravity, not shown for simplicity, such that when restriction is removed within any fuel flow path, fuel will flow from storage to engine upon demand. For purposes of description within the accompanying drawings, fuel presumed delivered by pressure pump or suction pump often employs bypass pressure regulation and, therefore, utilizes flow return lines for implementation. For purposes of description within the accompanying drawings, coolant is presumed delivered by pump or convection, not shown for simplicity, such that when restriction is removed within any coolant flow path, coolant will flow through a heat exchanger or coolant bypass as appropriate and if provided. For purposes of description within the accompanying drawings, various components and devices are not shown in their ideal locations, specifically as to not overlap or obscure for illustrative simplicity and clarity. As example, heat energy tends to naturally propagate upward by convection, and therefore all heat transfer elements depicted would ideally be located at the lowest point possible within engineering and manufacturing constraints. Instead, in many drawings various heat transfer elements are depicted progressing up the side of the vessel. Similarly, while various ports and control signals are drawn passing through various surfaces, or intermediately connecting or transitioning among themselves, this is not meant to infer the preclusion of the standard practice of utilizing appropriate fittings and mating connectors. For purposes of description within this application, the term "port" describes a point of entry or exit of a gas, liquid, congealed matter or combination of matter states thereof, be it an opening, orifice, tubing, pipe, mating connector or fitting. Also for purposes of description within this application, the term "coolant" while not technically accurate as typically being of a temperature above ambient when in useful form for this invention, is nevertheless a term of common public use, parlance and understanding, and herein if and where used describes a medium, typically but not limited to a liquid, used as a heat energy transfer medium from one location to another. A common example of a coolant would be a mixture of ethylene glycol and water that, when heated by means of passage though engine components, gains heat energy, and when subsequently passed through a heat exchanger, said heat energy may be removed for useful purpose.

Referring now to the drawings and, in particular, to FIG. 1, there is shown a fuel storage system 10 for providing fuel to an internal combustion engine. Fuel storage system 10 comprises a fuel storage vessel having an inner shell 22 and outer shell 20, constructed as manufacturing and physical integrity constraints allow to substantially create an interstitial volume 21 between inner shell 22 and outer shell 20, thereby creating a thermal insulation barrier.

Interstitial volume 21 may comprise a wide variety of substances, including but not limited to atmosphere, vacuum partial or high (i.e., the interstitial volume may be partially or completely evacuated), a gas or mixture of gases at atmospheric pressure, above atmospheric pressure, or at vacuum partial or high, a thermally insulative material, or combination thereof. As an example, an embodiment might utilize an insulating material such as perlite, a naturally occurring volcanic mineral, to occupy interstitial volume 21.

While concentric cylinders are shown in FIG. 1, this is for illustrative simplicity only, and does not preclude other physical or geometric embodiments, simple or complex, ideal or compromised, including those of varying or transitioning shell separation from wide to direct contact between outer shell 20 and inner shell 22, those providing partial coverage of outer shell 20 including but not limited to access and inspection points, or those providing partial or compromised interstitial volume 21 including but not limited to interstitial volume displaced by internal components and subsystems.

It should be noted for fuel storage system 10 that if the interstitial material chosen within interstitial volume 21 is a sufficient thermal barrier by nature, thickness, or both, and also possess sufficient structural properties, such material may serve as both interstitial space 21 and outer shell 20. Similarly, if the interstitial material within interstitial volume 21 is a sufficient thermal barrier by nature, thickness, or both, and also possess chemical resistive properties suitable for the containment of fuel therein, such material may serve as both interstitial space 21 and inner shell 22.

It should be noted for fuel storage system 10 that interstitial volume 21 may be repeated multiple times by the further addition of shell layers.

It should be noted for fuel storage system 10 that inner shell 22 may be repeated multiple times, both without interstitial volume 21 separating inner shells 22, thereby effectively partitioning inner shells 22 from within, or with an interstitial volume 21 between multiple inner shells 22, thereby creating multiple thermally independent inner shells 22. Likewise, all other elements associated with inner shell 22 and as described within this application may be shared, independently repeated, selectively implemented, or combined. In fact, nothing is to preclude a hybrid system comprising one or more thermally managed alternate fuel storage vessels fabricated with one or more conventional fuel storage vessels.

Fuel storage system 10 also comprises at least one length of tubing or channel serving as heat exchange mechanism 30, with coolant circulated within heat exchange mechanism 30 by means of its introduction and scavenge via ports 31 and 32. Introduction and scavenge of coolant may occur at extreme ends of the tubing or channel serving as heat exchange mechanism 30, or coolant may be introduced and removed via manifolds serving one or more segments of tubing or channel, or combination thereof utilizing intermediate manifolds. Heat exchange mechanism 30 may be in direct contact with the fuel within the storage vessel to accomplish heat transfer to said fuel, with the surface area of heat exchange mechanism 30 ideally maximized as practical for efficiency. In one embodiment, however, and as shown in FIG. 1, inner shell 22 comprises a thermally conductive material, and heat exchanger 30 is thermally bonded to shell 22 such that the surface area of shell 22 is utilized to transfer heat to any fuel contained therein. Likewise, it becomes possible to thermally bond heat exchanger 30 to either the inner or outer surface of shell 22; however, in one embodiment, and as shown in FIG. 1, heat exchanger 30 is mounted on the outside surface of shell 22. This construct provides for an unobstructed flow of fuel by eliminating the internal surfaces of components that might hinder fuel removal at the lowest point, and further reduces the number of walls that coolant introduction and scavenge ports 31 and 32 must transgress.

Fuel storage system 10 also comprises a fuel outlet orifice 39 that feeds fuel outlet port 33, which in turn supplies fuel directly or indirectly to the engine. Fuel outlet orifice 39 may, as illustrated, be located at the lowest point within the storage vessel with respect to gravity such that the majority of fuel contained within the vessel may be captured and removed through orifice 39. Baffles and other structures, not specifically shown in FIG. 1, may also be employed to direct fuel to orifice 39, or indirectly aid by reducing fuel slosh, turbulence and surface oscillations.

Fuel storage system 10 may also include a fuel inlet orifice 36 fed by port 37 such that any excess or abandoned fuel created by downstream components such as bypass pressure regulators are provided a mechanism to return fuel to storage.

Fuel storage system 10 may also include at least one temperature sensor as depicted by temperature sensor 40, whose placement provides an accurate or proximate measurement of fuel temperature within the vessel, either by direct contact and measurement, or by indirect means by contact with surfaces that at similar or proximate temperature to fuel such as shell 22. Temperature measurement data as provided by temperature sensor 40 as conveyed by signal 41 may be shared among a plurality of control purposes, or alternately, temperature sensor 40 may be replicated as required for a plurality of control purposes. One primary purpose and use of temperature data is the determination of usable fuel viscosity, the viscosity of many alternate fuels being a function of temperature.

It is further desirable to make the temperature data exportable and available to external engine control systems to preclude its consumption when temperature indicates that fuel viscosity is not usable.

Similarly, temperature data derived from sensor 40 or similar replicates can be used for the control of coolant within the heat exchanger, and the control of auxiliary heating and heat transfer derives, as described in detail below.

Fuel storage system 10 as shown in FIG. 1 may also include at least one filling port 23 to accommodate the introduction of fuel into the storage vessel. In the illustrated embodiment filling port 23 is constructed of material of weak thermal conductance, or a thermal barrier may be provided at 50 where it transitions through shell 20, or provided at 51 where it joins shell 21.

Filling port 23 or its associated cap or sealing mechanism may also include venting either by orifice or by pressure and vacuum threshold to relieve any internal vessel pressure and to allow the introduction of outside atmosphere as ullage is created during fuel consumption, or this may be accomplished by a separate or redundant mechanism within the fuel storage system, not specifically shown in FIG. 1.

Filling port 23 or its associated cap or sealing mechanism may also include a gauge mechanism, visible to the eye by window or exposed mechanism, or this may be accomplished by a separate or redundant mechanism within the fuel storage system, not specifically shown in FIG. 1.

Fuel storage system 10 may also include one or more viscosity sensors, not specifically shown in FIG. 1.

Figure 2:
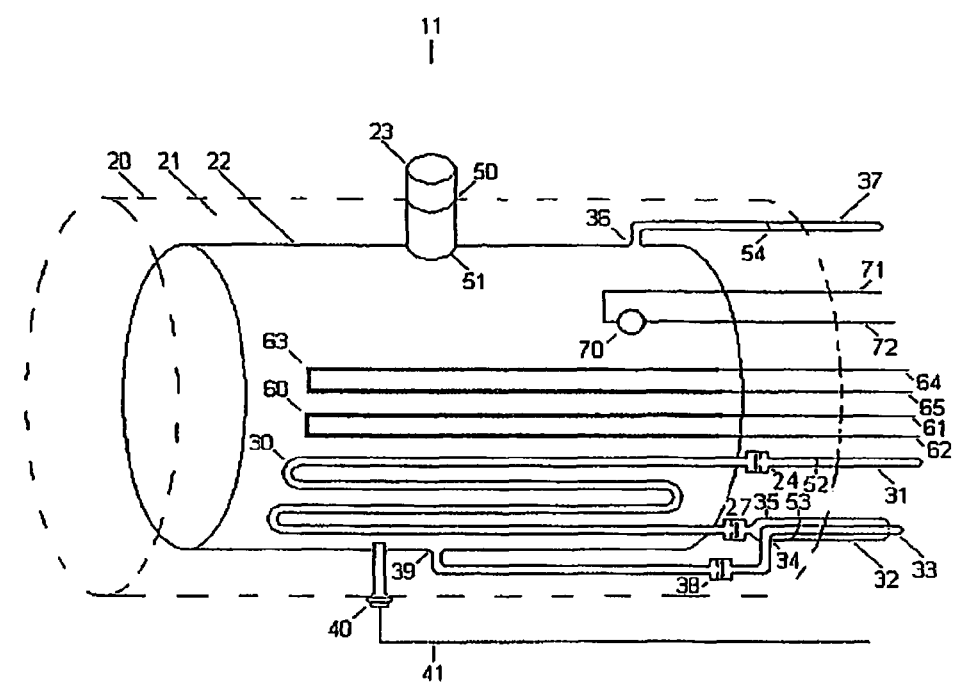
FIG. 2 is a perspective view of another fuel storage system according to embodiments of the present invention.

Referring now to the drawings and, in particular, to FIG. 2, there is shown a fuel storage system 11 for providing fuel to an internal combustion engine. Fuel storage system 11 comprises elements of fuel storage system 10, like numbers refer to like elements throughout, and like descriptions given for fuel storage system 10 also apply.

Fuel storage system 11 may also include at least one electrical heating element 60, shown in this example with electrical conductors 61 and 62, said heating element 60 serving as a separate heat source mechanism for the heating and maintenance of the temperature of the fuel. As an example, heating element 60 may be connected to external utility power while the vehicle remains in storage, maintaining a useable fuel viscosity. Upon such time as the vehicle is required for operation, the fuel will be available for consumption by the engine without delay.

Heating element 60 may be in direct contact with the fuel within the storage vessel to accomplish heat transfer to said fuel, with the surface area of heating element 60 ideally maximized as practical for efficiency. In one embodiment, however, and as shown in FIG. 2, inner shell 22 is comprised of a thermally conductive material, and heating element 60 is thermally bonded to inner shell 22 such that the surface area of inner shell 22 is utilized to transfer heat to any fuel contained therein. Likewise, it becomes possible to thermally bond heating element 60 to either the inward or outward surface of inner shell 22; however, in another embodiment, and as shown in FIG. 2, heating element 60 is mounted on the outside surface of shell 22. This construct provides for an unobstructed flow of fuel by eliminating the internal surfaces of components that might hinder fuel removal at the lowest point, and further reduces the number of walls that electrical conductors 61 and 62 must transgress.

Fuel storage system 11 may also include at least one supplemental electrical heating element 63, shown in this example with electrical conductors 64 and 65, said heating element 63 serving as a supplemental and separate heat source mechanism for the heating of and maintenance of the temperature of the fuel. Also, and as given in an example above, heating element 63 may likewise be connected to external utility power while the vehicle remains in storage, maintaining a useable fuel viscosity. Upon such time the vehicle is required for operation, the fuel will be available for consumption by the engine without delay.

Similarly, supplemental heating elements such as heating element 63 may be in direct contact with the fuel within the storage vessel to accomplish heat transfer to said fuel, with the surface area of heating element 63 ideally maximized as practical for efficiency. In one embodiment, however, and as shown in FIG. 2, inner shell 22 is comprised of a thermally conductive material, and heating element 63 is thermally bonded to inner shell 22 such that the surface area of inner shell 22 is utilized to transfer heat to any fuel contained therein. Likewise, it becomes possible to thermally bond heating element 63 to either the inward or outward surface of inner shell 22, however in a preferred embodiment, and as shown in FIG. 2, heating element 63 is mounted on the outside surface of shell 22. This construct provides for an unobstructed flow of fuel by eliminating the internal surfaces of components that might hinder fuel removal at the lowest point, and further reduces the number of walls that electrical conductors 64 and 65 must transgress.

By incorporating more than one active heating element, more heat energy may be transferred over a given period of time, thus reducing heating time. Moreover, independent and coordinated control may be exerted over multiple elements. As an example, once a desired temperature is approached or achieved, the number of heating elements that are active may be reduced. The thermal output capacity of the individual elements may also differ. As an example, one element such as heating element 60 may be designed for large thermal output capacity for rapid heating, and a different heating element 63 designed for lesser thermal output capacity for the maintenance or stabilization of fuel temperature against system thermal losses.

Thermostatic control is likewise desired for heating elements such as 60 and 63. Thermostatic control may be exerted independently upon each element, in tandem, or combination thereof. Thermostatic control may be achieved by the control of current through the heating elements, including but not limited to presence, absence, modulation of amplitude, modulation of duty cycle, or a combination thereof. In one embodiment, such control becomes a function of fuel temperature as provided by temperature sensor 40 or other temperature sensor proximate to fuel or the controlled heating elements. In another embodiment, a closed-loop system such as one utilizing a Proportional-Integral-Derivative (PID) algorithm may be employed.

Heating elements such as 60 and 63 may also be designed to be self-limiting at or near a specific temperature by employing resistive elements with a positive temperature coefficient such that as temperature increases, electrical resistance increases also.

Fuel storage system 11 may also include at least one secondary temperature limiting mechanism employed as a fail-safe mechanism against failure of the primary thermostatic system involving a thermal run-away condition. As shown in FIG. 2, temperature sensor 70 is mounted proximate to electrical heating elements 60 and 63, and serves to signal when a maximum safe or allowed temperature threshold has been exceeded. As an example, in one possible embodiment temperature sensor 70 serves as a simple thermostat that conducts electrical current beneath a predefined temperature threshold, and ceases to conduct electrical current if and when that temperature threshold is exceeded. Temperature sensor 70 may be electrically connected in series with the electrical power source such that electrical current is automatically interrupted when said temperature threshold is exceeded. In another exemplary embodiment, it is desirable to limit the electrical energy within temperature sensor 70 as electrical thermostatic devices often are of bimetallic spring or lever design containing mechanical contacts that may arc. While most alternate fuels are not volatile and therefore do not appreciably produce explosive vapors, nevertheless, with the system 11 being a fuel storage vessel where end use cannot always be predicted or controlled, safe engineering practice dictates limiting the energy within the arc beneath a threshold capable of ignition of explosive vapor. Consequently, electrical energy within temperature sensor 70 is limited beneath ignition threshold, rendered so-called intrinsically safe, and a secondary relay, contactor or control device that is not proximate to vapor, explosion-proof by construction, incapable of arc, or a combination thereof, is employed to respond to the intrinsically safe signal and electrically interrupt the higher electrical currents employed within heating elements 60 and 63 as required.

Fuel storage system 11 may also be constructed such that the fuel outlet port 33 is ensconced by or largely thermally coupled to one or more of the heat exchange ports carrying engine coolant. As shown in FIG. 2, fuel outlet port 33 enters heat exchanger port 32 at point 34 and becomes coaxially embedded within heat exchanger port 32. This ensconced configuration may also continue to the engine, a valve, or another destination, thereby preventing congealment or solidification of the fuel within fuel outlet port 33 due to potential thermal energy loss that would otherwise be attributable to an exposed fuel line embodiment.

Fuel storage system 11 may also include anti-siphon valve 38 to prevent reverse fuel flow, thereby mitigating the contamination of vessel contents, and further, the loss of pump prime. Anti-siphon valve 38 may further be constructed with thermally insulating poppet material that, when closed in absence of fuel flow, reduces thermal energy transfer and thermal energy convective loss. While FIG. 2 depicts anti-siphon valve 38 located within interstitial volume 21, there is nothing to preclude anti-siphon valve 38 being located within inner shell 22 or external to outer shell 20.

Fuel storage system 11 may also include one or more check, pressure or vacuum threshold valves 24 and 27 on heat exchanger ports 31 and 32 to mitigate heat energy loss from convective flow. Valves 24 and 27 may further be constructed with thermally insulating poppet material that, when closed in absence of fuel flow, further reduces thermal energy transfer loss. While FIG. 2 depicts valves 24 and 27 located within interstitial volume 21, there is nothing to preclude valves 24 and 27 being located within inner shell 22 or external to outer shell 20.

Figure 3:
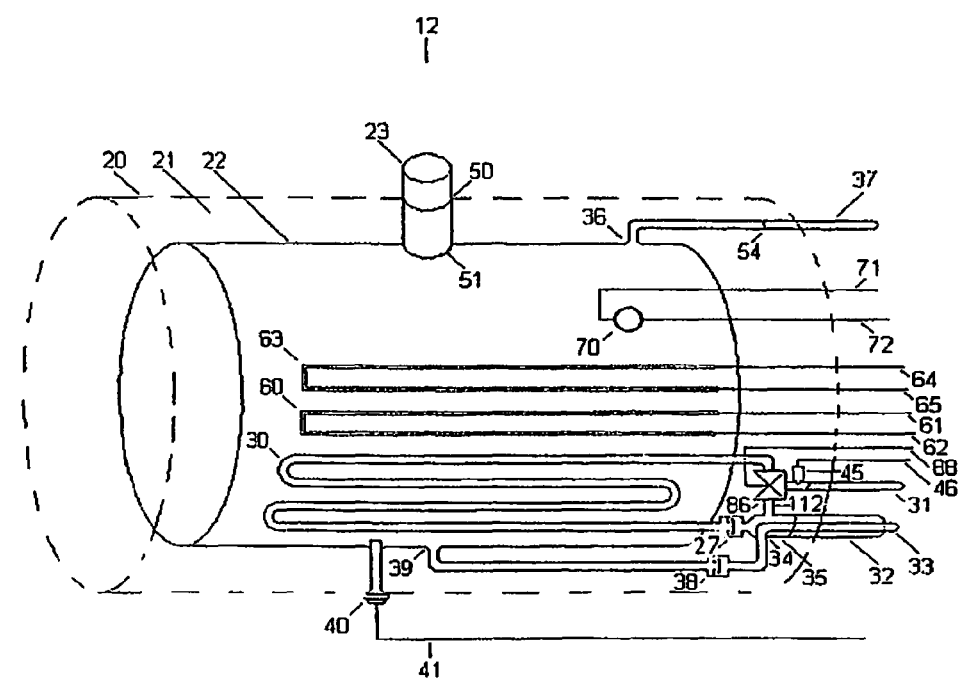
FIG. 3 is a perspective view of still another fuel storage system according to embodiments of the present invention.

Referring now to the drawings and, in particular, to FIG. 3, there is shown a fuel storage system 12 for providing fuel to an internal combustion engine. Fuel storage system 12 comprises elements of fuel storage systems 10 and 11, like numbers referring to like elements throughout, and like descriptions given for fuel storage systems 10 and 11 also applying to the system 12.

Fuel storage system 12 may also include one or more thermal control mechanisms for heat exchanger 30 such that coolant flow is controlled in such manner to regulate the flow of coolant within heat exchanger 30 to control the transfer of heat energy between heat exchanger 30 and the fuel within the storage vessel. The thermal control mechanism may also further serve to prevent the reverse flow of thermal energy when the temperature of coolant flow is less than that of the fuel within the storage vessel. As an example, in one state, defined herein as the bypass state, three-way valve 86 serves to substantially bypass coolant from inlet port to outlet port, limiting or preventing coolant circulation within heat exchanger 30 while still allowing circulation of coolant between ports 31 and 32. The volume of coolant being bypassed may be controlled by the restriction created by line 112, or by including a discrete orifice within line 112. In another state, defined herein as the active state, three-way valve 86 serves to substantially allow coolant to flow through heat exchanger 30. In both states, by variety of possible placement, a temperature sensor 45 is made aware of coolant temperature. In one embodiment, valve 86 remains in the bypass state until a defined coolant temperature threshold is reached, said coolant temperature threshold typically being that which would preclude fuel congealment of solidification. If and when said coolant temperature threshold is reached, valve 86 then transitions to the active state, thereby permitting flow of coolant within heat exchanger 30 and the transfer of heat energy to any fuel stored within the vessel. The control mechanism may be improved by incorporating a vessel or fuel temperature sensor 40. If and when a maximum desired vessel or fuel temperature threshold is reached as determined by temperature sensor 40, threshold valve 86 may again be transitioned to the bypass state, limiting further thermal energy transfer between heat exchanger 30 and the vessel. If the vessel or fuel temperature as determined by temperature sensor 40 decreases beneath said threshold, valve 86 may again be transitioned to the active state to again effect thermal energy transfer, and so on.

Yet another control mechanism improvement may be realized by vessel or fuel temperature sensor 40. If and when coolant temperature as determined by temperature sensor 45 exceeds that of vessel or fuel temperature sensor 40 and vessel or fuel temperature sensor 40 is beneath the maximum desired vessel or fuel temperature, valve 86 may transition to the active state, thereby commencing thermal energy transfer at the earliest possible point whereby energy would be transferred between coolant and vessel, thereby reducing heating time. Without temperature sensor 40 or its incorporation into this algorithm, the control mechanism would have to wait until temperature sensor 45 was at a threshold to preclude congealment or solidification so as to eliminate the risk or reverse thermal energy transfer if the temperature of the fuel were in fact greater than the coolant. It should be further stated that while the transition between bypass and active states may be abrupt and total, valve 86 may also be implemented as to divert fractionally between bypass and the heat exchanger 30, thereby effecting finer control over thermal heat transfer. Other possible thermal control mechanism embodiments exist, and some are enumerated below. Also, while FIG. 3 depicts the thermal control mechanism located within interstitial volume 21, there is nothing to preclude the thermal control mechanism being located within inner shell 22, external to outer shell 20, or distributed among various locations.

Figure 4:
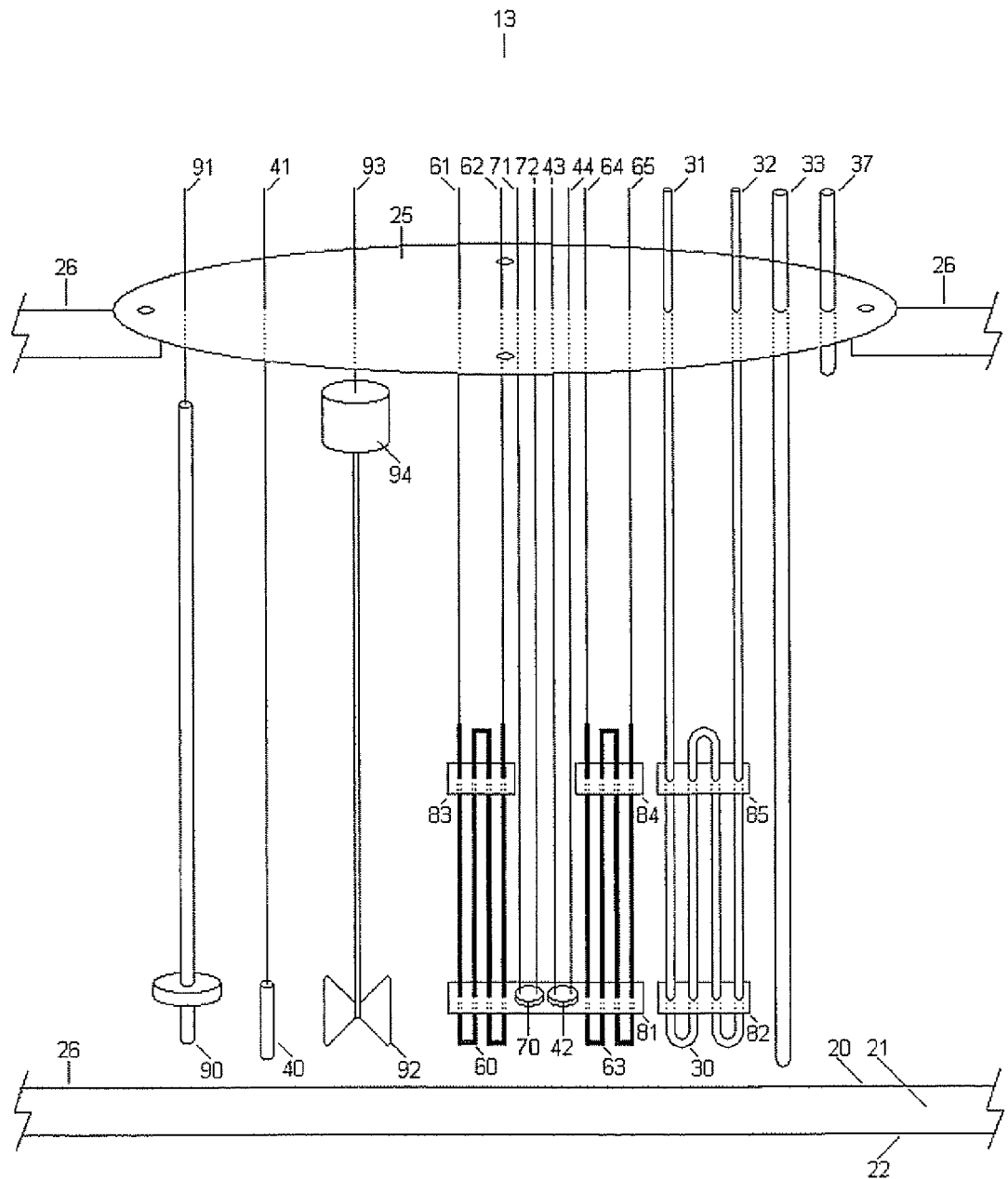
FIG. 4 is a schematic view of yet another fuel storage system according to embodiments of the present invention.

Referring now to the drawings and, in particular, to FIG. 4, there is shown a fuel storage system 13 for providing fuel to an internal combustion engine. Fuel storage system 13 substantially comprises elements common to fuel storage systems 10, 11 and 12, with like numbers referring to like elements throughout; however, fuel storage system 13 differs in mechanical embodiment.

Fuel storage system 13 comprises a mechanical assembly whereby a subset or majority of elements may be affixed to one or more common plates or other mounting structure such that said elements may be installed, removed or replaced as a group. Such grouping of elements is common in the automotive industry whereby assembly cost may be minimized, and where repair cost in time and labor can overcome the cost of replacing associated elements that are otherwise functional when one or more elements fail. The same cost benefit remains true regarding diagnostic time and conveyance of skill, as component group replacement in total encompasses all failure possibilities and therefore requires less diagnostic time or skill.

Fuel storage system 13 comprises at least one length of tubing or channel serving as heat exchange mechanism 30, with coolant circulated within heat exchange mechanism 30 by means of its introduction and scavenge via ports 31 and 32. Introduction and scavenge of coolant may occur at extreme ends of the tubing or channel serving as heat exchange mechanism 30 as shown, or coolant may be introduced and removed via manifolds serving one or more segments of tubing or channel, or combination thereof utilizing intermediate manifolds. Heat exchange mechanism 30 may be in direct contact with the fuel within the storage vessel to accomplish heat transfer to said fuel. The surface area of heat exchange mechanism 30 may also be further increased as practical for efficiency with one or more surface area extensions such as extensions 82 and 85. If inner shell 22 comprises a thermally conductive material, heat exchanger 30 and associated surface extensions 82 and 85 may be mechanically constructed as to thermally contact upon assembly to shell 22 such that the surface area of shell 22 is utilized to transfer heat to any fuel contained therein.

Because the heat exchange method of fuel storage system 13 does not specifically rely upon or require shell 22 for thermal heat transfer between heat source and fuel stored with the storage vessel, shell 22 is no longer required to be thermally conductive; in fact, it may be a thermal insulator. Consequently, while the vessel for fuel system 13 may comprise outer shell 20, an interstitial space 21, and inner shell 22, it may also comprise a fewer number of materials, or a single material, depicted as 26, with material 26 selected to be of a physical nature that provides thermal insulation, structural integrity, and chemical resistance to fuel, or suitable compromise thereof.

Fuel storage system 13 may also include at least one electrical heating element 60, shown in this example with electrical conductors 61 and 62, said heating element 60 serving as a separate heat source mechanism for the heating of and maintenance of the temperature of the fuel. As an example, heating element 60 may be connected to external utility power while the vehicle remains in storage, maintaining a useable fuel viscosity. Upon such time as the vehicle is required for operation, the fuel will be available for consumption by the engine without delay.

Heating element 60 may be in direct contact with the fuel within the storage vessel to accomplish heat transfer to said fuel. The surface area of heat exchange mechanism 60 may also be further increased as practical for efficiency with one or more surface area extensions such as extensions 81, 83 and 84. If inner shell 22 comprises a thermally conductive material, heat exchanger 60 and associated surface extensions 81, 83 and 84 may be mechanically constructed as to thermally contact upon assembly to shell 22 such that the surface area of shell 22 is utilized to transfer heat to any fuel contained therein.

Fuel storage system 13 may also include at least one supplemental electrical heating element 63, shown in this example with electrical conductors 64 and 65, said heating element 63 serving as a supplemental and separate heat source mechanism for the heating of and maintenance of the temperature of the fuel. Also, and as given in an example above, heating element 63 may likewise be connected to external utility power while the vehicle remains in storage, maintaining a useable fuel viscosity. Upon such time as the vehicle is required for operation, the fuel will be available for consumption by the engine without delay.

Similarly, supplemental heating elements such as heating element 63 may be in direct contact with the fuel within the storage vessel to accomplish heat transfer to said fuel. The surface area of heating element 63 may also be further increased as practical for efficiency with the extensions 81, 83 and 84. If inner shell 22 comprises a thermally conductive material, heat exchanger 60 and associated surface extensions 81, 83 and 84 may be mechanically constructed as to thermally contact upon assembly to shell 22 such that the surface area of shell 22 is utilized to transfer heat to any fuel contained therein.

To further increase the surface area for heat energy transfer as practical for efficiency, surface extensions of heat exchanger 30 and electrical heating elements 60 and 63 may be shared or made common. As an example, surface area extensions 83, 84 and 85 may be joined. Similarly, surface area extensions 81 and 82 may be shared or made common.

By incorporating more than one active heating element, more heat energy may be transferred over a given period of time, thus reducing heating time. Moreover, independent and coordinated control may be exerted over multiple elements. As an example, once a desired temperature is approached or achieved, the number of heating elements that are active may be reduced. The thermal output capacity of the individual elements may also differ. As an example, one element such as heating element 60 may be designed for large thermal output capacity for rapid heating, and a different heating element 63 designed for lesser thermal output capacity for the maintenance or stabilization of fuel temperature against system thermal losses.

Thermostatic control is likewise desired for heating elements such as 60 and 63. Thermostatic control may be exerted independently upon each element, in tandem, or combination thereof. Thermostatic control may be achieved by the control of current through heating elements, including but not limited to presence, absence, modulation of amplitude, modulation of duty cycle, or a combination thereof. In one embodiment, such control becomes a function of element temperature as provided by temperature sensor 42. As it is possible in this embodiment that fuel may be absent, temperature sensor 42 is placed as to be directly thermally coupled to associated heating elements. In another embodiment, a closed-loop system such as one utilizing a Proportional-Integral-Derivative (PID) algorithm may be employed.

Similarly, temperature data derived from sensor 42 may be used for the control of coolant within the heat exchanger, and the control of auxiliary heating and heat transfer, to be described in detail below.

Heating elements such as 60 and 63 may also be designed to be self-limiting at or near a specific temperature by employing a resistive element with a positive temperature coefficient such that as temperature increases, electrical resistance increases also.

Fuel storage system 13 may also include at least one secondary temperature limiting mechanism employed as a fail-safe mechanism against failure of the primary thermostatic system or other thermal run-away condition. As shown in FIG. 4, temperature sensor 70 is mounted as to be directly thermally coupled to associated electrical heating elements 60 and 63, and serves to signal when a maximum safe or allowed temperature threshold has been exceeded. As an example, in one possible embodiment temperature sensor 70 serves as a simple thermostat that conducts electrical current beneath a predefined temperature threshold, and ceases to conduct electrical current when that temperature threshold is exceeded. Mounted proximate to heating elements, temperature sensor 70 is electrically connected in series with the electrical power source such that electrical current is automatically interrupted when said temperature threshold is exceeded. In another exemplary embodiment, it is desirable to limit the electrical energy within temperature sensor 70, as electrical thermostatic devices often are of a bimetallic spring or lever design containing mechanical contacts that may arc. While most alternate fuels are not volatile and, therefore, do not appreciably produce explosive vapors, system 13 may be assembled into a fuel storage system where end use cannot always be predicted, so safe practice dictates limiting the energy within the arc beneath a threshold capable of ignition of explosive vapor. Consequently, electrical energy within temperature sensor 70 may be limited beneath ignition threshold, rendered so-called intrinsically safe, and a secondary relay, contactor or control device not proximate to vapor, explosion-proof by construction, incapable of arc, or a combination thereof, is employed to respond to the intrinsically safe signal and electrically interrupt the higher electrical currents employed within heating elements 60 and 63 as required.

Fuel storage system 13 may also include at least one temperature sensor as depicted by temperature sensor 40, whose placement provides an accurate or proximate measurement of fuel temperature within the vessel. Temperature measurement data as provided by temperature sensor 40 as conveyed by signal 41 may be shared among a plurality of control purposes, or alternatively, temperature sensor 40 may be replicated as required for a plurality of control purposes. One primary purpose and use of temperature data is the determination of usable fuel viscosity, the viscosity of many alternate fuels being a function of temperature.

It may be further desirable to make the temperature data as provided by temperature sensor 40 exportable and available to external engine control systems to preclude its consumption when temperature indicates that fuel viscosity is not usable.

Fuel storage system 13 may also include a fuel outlet port 33, which in turn supplies fuel directly or indirectly to the engine. The inlet point of fuel outlet orifice 33 may be located at the lowest point within the storage vessel with respect to gravity such that the majority of fuel contained within the vessel may be captured and removed.

Fuel storage system 13 may also include a fuel inlet or port 37 such that any excess or abandoned fuel created by downstream components such as bypass pressure regulators are provided a mechanism to return fuel to storage.

Fuel storage system 13 may also include a fuel volume or level sensor 90 whose status is conveyed by signal 91, as shown in FIG. 4.

Fuel storage system 13 may also include a fuel viscosity sensor as shown in FIG. 4. As an example of one such viscosity sensor, motor 94 turns impeller 92, where the electrical current consumed by motor 94 and conveyed by signal 93 is proportional to motor torque and also proportional to viscosity.

Fuel storage system 13 may also include other elements that while not specifically shown in FIG. 4 are nevertheless inherited from fuel storage systems 10, 11 and 12 as enumerated above. As an example, fuel storage system 13 may include at least one filling port to accommodate the introduction of fuel into the storage vessel, and may also include at least one venting mechanism to allow the introduction of outside atmosphere as ullage is created during fuel consumption. Likewise, fuel storage system 13 may also be constructed such that the fuel outlet port 33 is ensconced by or largely thermally coupled to one or more of the heat exchange ports 31 and 32 carrying engine coolant. This ensconced configuration may also continue to the engine, a valve, or another destination, thereby preventing congealment or solidification of the fuel due within fuel outlet port 33 due to potential thermal energy loss that would otherwise be attributable to an exposed fuel line embodiment.

Fuel storage system 13, as was depicted in fuel storage system 12, may also include a variety of possible thermal control mechanisms to control the flow of coolant through heat exchanger 30. Said thermal control mechanisms may be located beneath plate 25, above plate 25, distributed across both, external, or any combination thereof.

Examples of some possible thermal control mechanisms to control the flow of coolant through heat exchanger 30 as they apply to fuel storage systems 10, 11, 12 and 13 will now be described.

Figure 5:
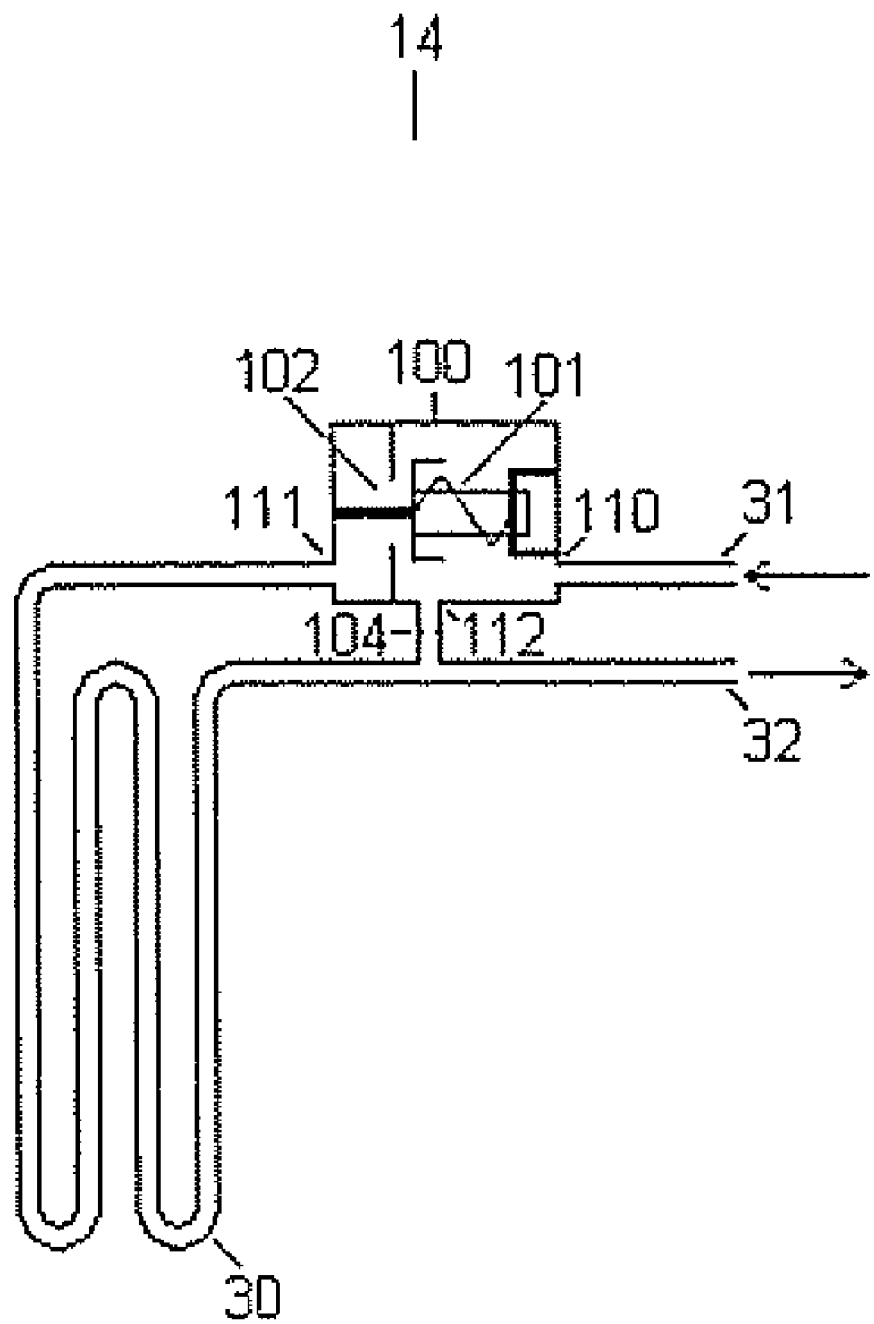
FIG. 5 is a schematic view of a thermal control mechanism according to embodiments of the present invention.

Referring now to the drawings and, in particular, to FIG. 5, there is shown a thermal control mechanism 14 for providing the control the flow of coolant through heat exchanger 30. Thermal control mechanism 14 comprises a heat exchanger 30, coolant inlet port 31, coolant outlet port 32, a thermostatic valve element 100 further comprising a thermal piston assembly 101, valve seat 102, inlet port 110, outlet port 111, bypass port 112, and restrictive orifice 104.

The thermostatic valve element 100 is designed such that coolant circulates proximate to thermal piston assembly 101 whether valve seat 102 is open or closed, thus allowing thermal piston assembly 101 to sense coolant temperature. When the valve seat 102 is in the closed position, coolant flows from inlet port 110 to bypass port 112. The volume of coolant being bypassed may be controlled by the restriction created by port 112, or by including discrete orifice 104, or both. When the valve seat 102 is in the open position, coolant flows from inlet port 110 to outlet port 111, with some coolant flow continuing through bypass port 112 as controlled or limited by orifice 104. Thermal piston assembly 101 contains a wax common among vehicle radiator thermostatic control systems, which upon reaching a melting temperature threshold also expands in volume, thereby driving an internal piston against a spring, whose motion in this embodiment opens valve seat 102, thus permitting the flow of coolant from inlet port 110 to outlet port 111. Such a thermal control mechanism may serve to prevent the reverse flow of thermal energy, as the temperature of coolant flow may be potentially less than that of the fuel within the storage vessel. By delaying coolant flow until the coolant has reached a temperature as determined by the melting point temperature of the wax, the potential of reverse thermal energy flow is thereby prevented.

Figure 6:
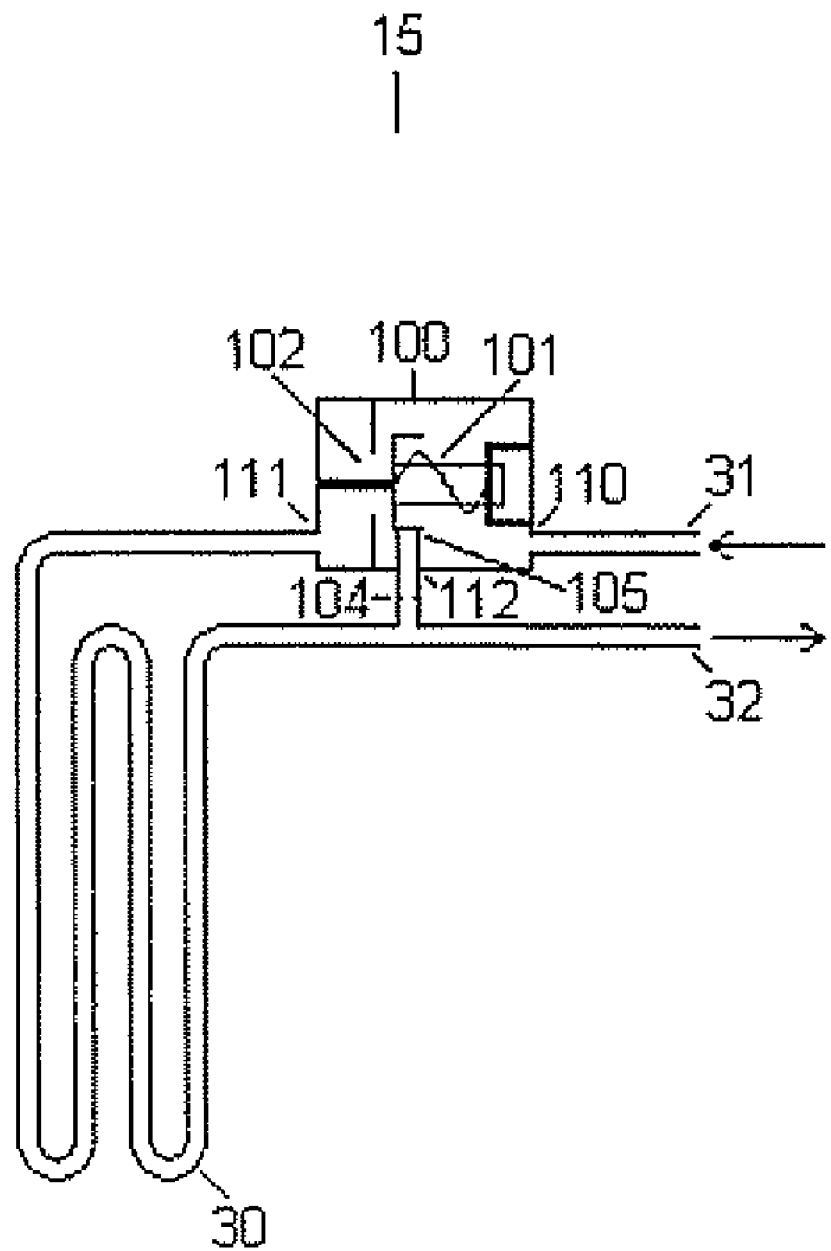
FIG. 6 is a schematic view of another thermal control mechanism according to embodiments of the present invention.

Referring now to the drawings and, in particular, to FIG. 6, there is shown a thermal control mechanism 15 for providing control of the flow of coolant through heat exchanger 30. Thermal control mechanism 15 comprises elements of thermal control mechanism 14, like numbers refer to like elements throughout, and like descriptions given for thermal control mechanism 14 also apply.

Thermal control mechanism 15 performs similarly to thermal control mechanism 14, with the exception of the valve flange surface of thermal piston assembly 101 being modified such that, when open as to permit flow from inlet port 110 to outlet port 111, the flange additionally restricts bypass flow exiting port 112. Whereas coolant bypass flow is necessary to induce coolant flow proximate to thermal piston assembly 101 when closed for sensing purposes, once thermal piston assembly 101 is open, bypass flow represents heat energy forfeited that could instead be routed to heat exchanger 30. Reducing or eliminating bypass flow once no longer needed improves system efficiency.

Figure 7:
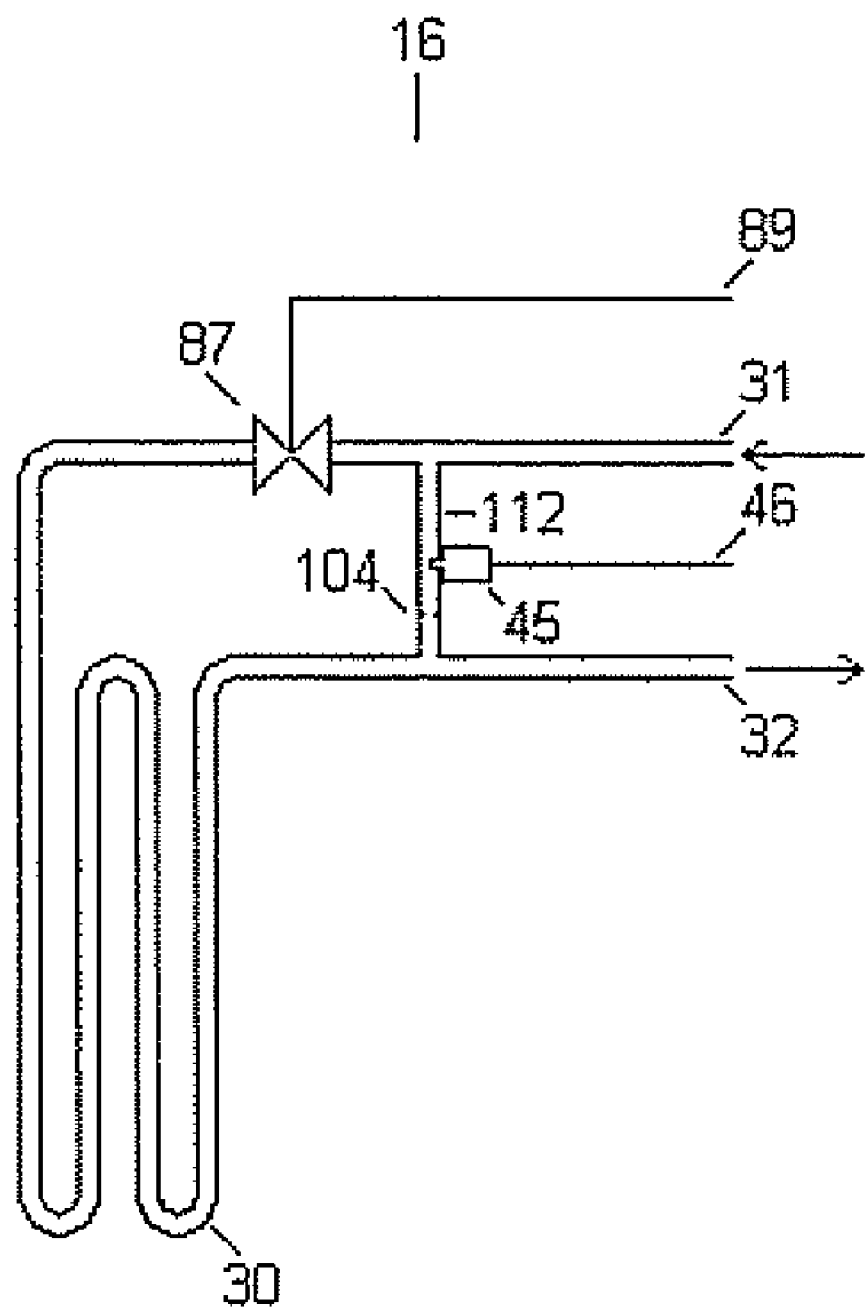
FIG. 7 is a schematic view of still another thermal control mechanism according to embodiments of the present invention.

Referring now to the drawings and, in particular, to FIG. 7, there is shown a thermal control mechanism 16 for providing the control the flow of coolant through heat exchanger 30. Thermal control mechanism 14 comprises a heat exchanger 30, coolant inlet port 31, coolant outlet port 32, two-way valve 87, temperature sensor 45 with output conveyed by signal 46, bypass port 112, and restrictive orifice 104.

In the closed state, two-way valve 87 serves to substantially block coolant flow, limiting or preventing coolant circulation within heat exchanger 30. Circulation of coolant is otherwise allowed to flow from inlet ports 31 to outlet port 32 via bypass 112. The volume of coolant being bypassed may be controlled by the restriction created by pass 112, or by including discrete orifice 104, or both. In the open state, two-way valve 87 serves to substantially allow coolant to flow through heat exchanger 30. In both states, by variety of possible placement, a temperature sensor 45 is made aware of coolant temperature, and output signal 46 directly or indirectly controls valve 87. Valve 87 remains in the closed state until a defined coolant temperature threshold is reached, said coolant temperature threshold typically being that which would preclude fuel congealment of solidification. If and when said coolant temperature threshold is reached, valve 87 then transitions to the open state, thereby permitting flow of coolant within heat exchanger 30 and the transfer of heat energy to any fuel stored within the vessel. Such a thermal control mechanism may serve to prevent the reverse flow of thermal energy, as the temperature of coolant flow may be potentially less than that of the fuel within the storage vessel. By delaying coolant flow until the coolant has reached a temperature as determined by threshold, the potential of reverse thermal energy flow is thereby prevented.

Figure 8:
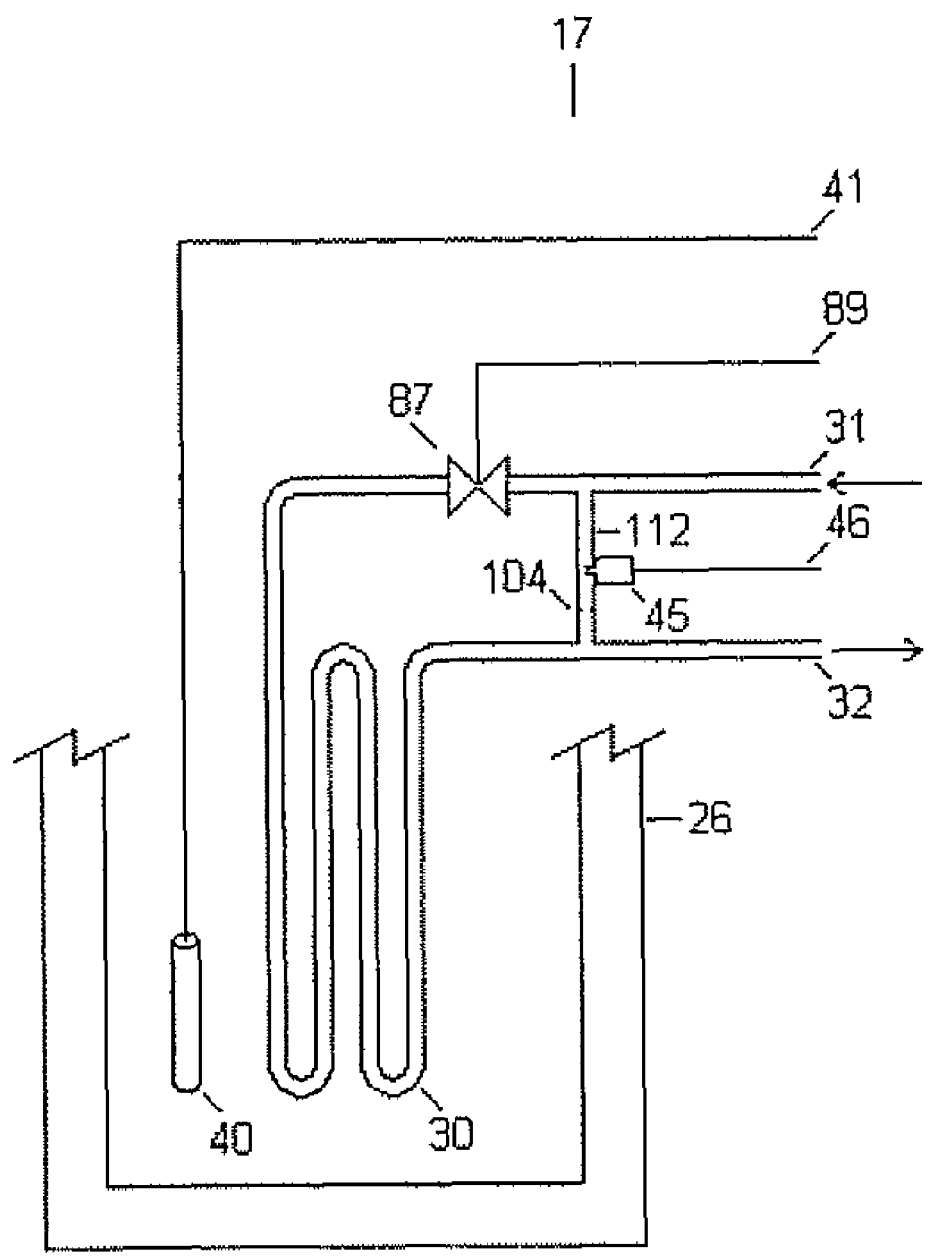
FIG. 8 is a schematic view of yet another thermal control mechanism according to embodiments of the present invention.

Referring now to the drawings and, in particular, to FIG. 8, there is shown a thermal control mechanism 17 for providing the control the flow of coolant through heat exchanger 30. Thermal control mechanism 17 comprises elements of thermal control mechanism 16, like numbers refer to like elements throughout, and like descriptions given for thermal control mechanism 16 also apply. Thermal control mechanism 17 performs similarly to thermal control mechanism 16; however, it further comprises temperature sensor 40 within fuel storage vessel 26, with temperature sensor 40 being used to measure fuel temperature.

Thermal control mechanism 17 incorporates fuel temperature sensor 40. If and when a maximum desired fuel temperature threshold is reached as determined by temperature sensor 40, upon said threshold valve 87 may again be transitioned to the closed state, thereby limiting further thermal energy transfer between heat exchanger 30 and fuel. If the vessel or fuel temperature as determined by temperature sensor 40 decreases beneath said threshold, valve 87 may again be transitioned to the open state to again effect thermal energy transfer, and so on. Yet another control mechanism improvement may be realized by fuel temperature sensor 40. If and when coolant temperature as determined by temperature sensor 45 exceeds that of fuel temperature sensor 40 and fuel temperature sensor 40 is beneath the maximum desired vessel or fuel temperature, valve 87 may transition to the open state, thereby commencing thermal energy transfer at the earliest possible point, whereby energy would be transferred between coolant and vessel, thereby reducing heating time. Without temperature sensor 40 or its incorporation into this algorithm, the control mechanism would have to wait until temperature sensor 45 was at a threshold typically sufficient to preclude congealment or solidification in order to eliminate the risk or reverse thermal energy transfer if the temperature of the fuel were in fact greater than the coolant. It should be further stated that while the transition between bypass and active states may be abrupt and total, valve 87 may also be implemented as to transition fractionally between open and closed, thereby effecting finer control over thermal heat transfer.

Figure 9:
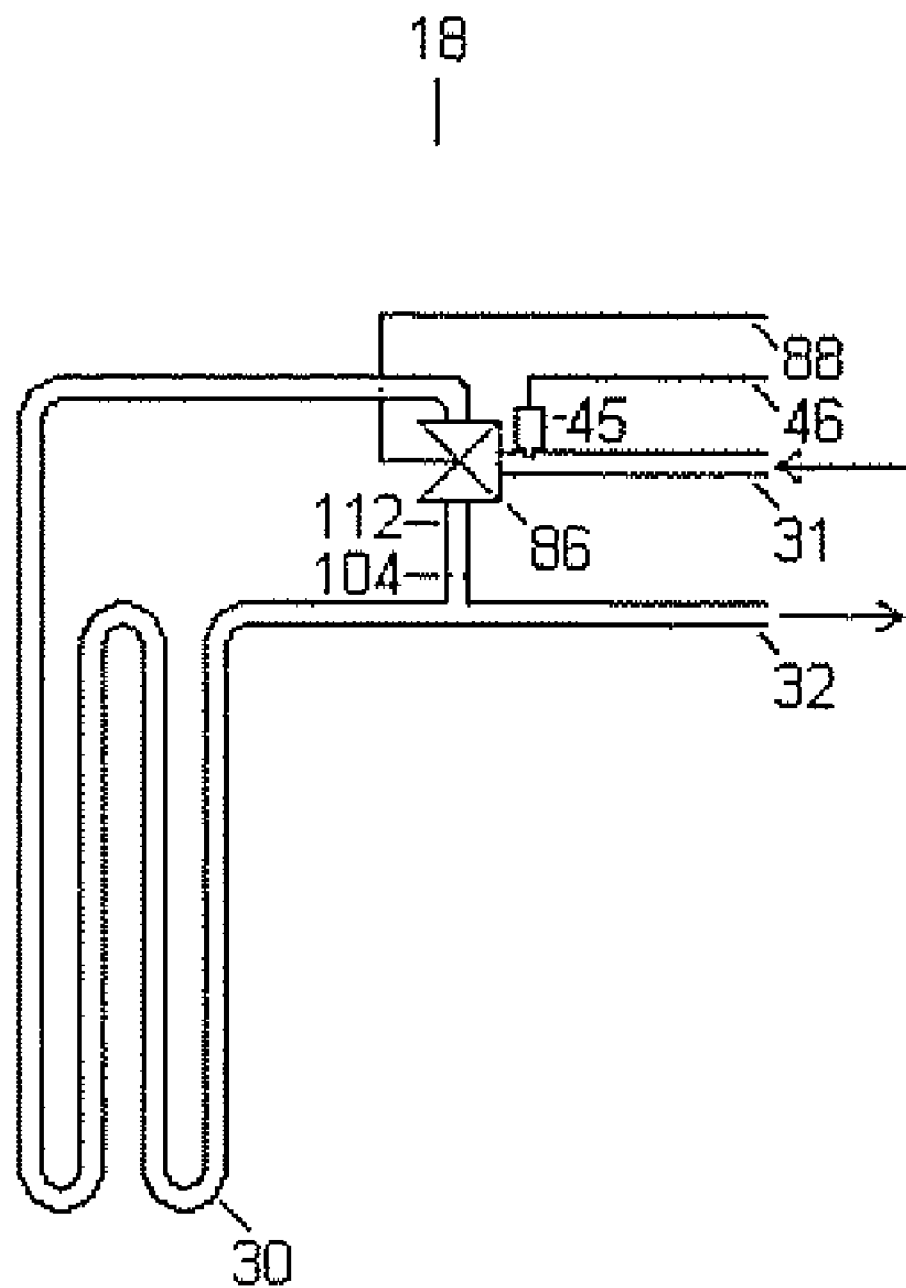
FIG. 9 is a schematic view of still another thermal control mechanism according to embodiments of the present invention.

Referring now to the drawings and, in particular, to FIG. 9, there is shown a thermal control mechanism 18 for controlling the flow of coolant through heat exchanger 30. Thermal control mechanism 18 comprises a heat exchanger 30, coolant inlet port 31, coolant outlet port 32, three-way valve 86, temperature sensor 45 with output conveyed by signal 46, bypass port 112, and restrictive orifice 104.

In one state, defined herein as the bypass state, three-way valve 86 serves to substantially bypass coolant from inlet port to outlet port, limiting or preventing coolant circulation within heat exchanger 30 while still allowing circulation of coolant between ports 31 and 32. The volume of coolant being bypassed may be controlled by the restriction created by line 112, by including discrete orifice 104, or both. In another state, defined herein as the active state, three-way valve 86 serves to substantially allow coolant to flow through heat exchanger 30. In both states by variety of possible placement, a temperature sensor 45 is made aware of coolant temperature, and output signal 46 directly or indirectly controls valve 86. Valve 86 remains in the bypass state until a defined coolant temperature threshold is reached, said coolant temperature threshold typically being that which would preclude fuel congealment of solidification. If and when said coolant temperature threshold is reached, valve 86 then transitions to the active state, thereby permitting flow of coolant within heat exchanger 30 and the transfer of heat energy to any fuel stored within the vessel.

Figure 10:
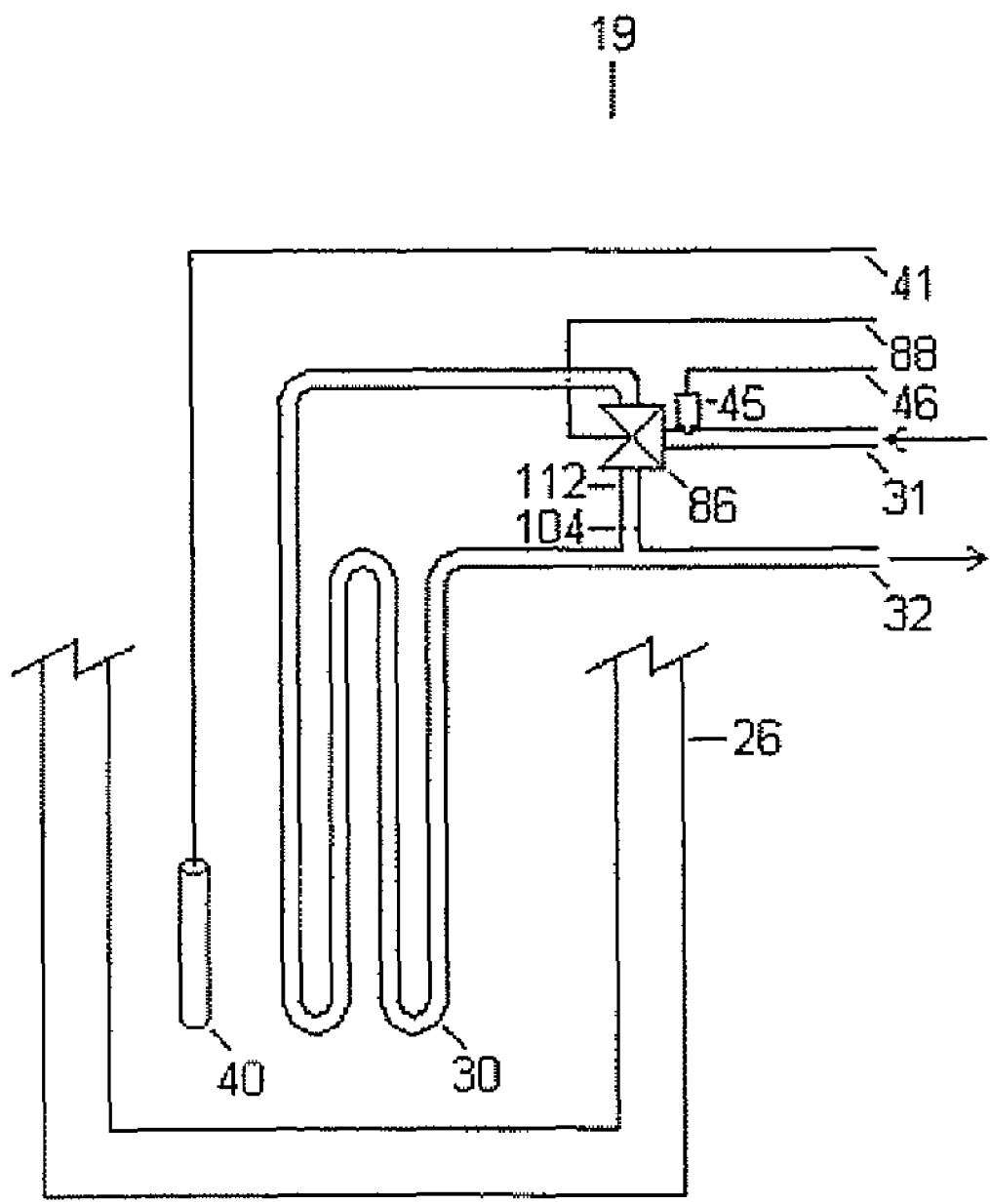
FIG. 10 is a schematic view of yet another thermal control mechanism according to embodiments of the present invention.

Referring now to the drawings and, in particular, to FIG. 10, there is shown a thermal control mechanism 19 for providing the control the flow of coolant through heat exchanger 30. Thermal control mechanism 19 comprises elements of thermal control mechanism 18, like numbers refer to like elements throughout, and like descriptions given for thermal control mechanism 18 also apply. Thermal control mechanism 19 performs similarly to thermal control mechanism 18; however, it further comprises temperature sensor 40 within fuel storage vessel 26, with temperature sensor 40 being used to measure fuel temperature.

Thermal control mechanism 19 incorporates fuel temperature sensor 40. If and when a maximum desired fuel temperature threshold is reached as determined by temperature sensor 40, upon said threshold valve 86 may again be transitioned to the bypass state, thereby limiting further thermal energy transfer between heat exchanger 30 and fuel. If the vessel or fuel temperature as determined by temperature sensor 40 decreases beneath said threshold, valve 86 may again be transitioned to the active state to again effect thermal energy transfer, and so on. Yet another control mechanism improvement may be realized by fuel temperature sensor 40. If and when coolant temperature as determined by temperature sensor 45 exceeds that of fuel temperature sensor 40 and fuel temperature sensor 40 is beneath the maximum desired vessel or fuel temperature, valve 86 may transition to the active state, thereby commencing thermal energy transfer at the earliest possible point, whereby energy would be transferred between coolant and vessel, thereby reducing heating time. Without temperature sensor 40 or its incorporation into this algorithm, the control mechanism would have to wait until temperature sensor 45 was at a threshold typically sufficient to preclude congealment or solidification in order to eliminate the risk or reverse thermal energy transfer if the temperature of the fuel were in fact greater than the coolant. It should be further stated that while the transition between bypass and active states may be abrupt and total, valve 86 may also be implemented as to transition fractionally between bypass and active states, thereby effecting finer control over thermal heat transfer.

Many modifications and other embodiments of the inventions set forth herein will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A fuel tank for storing an alternate fuel and providing the fuel to an internal combustion engine, comprising:
    an inner shell with an internal cavity designed to store fuel;
    an outer shell configured and positioned relative to the inner shell such that an interstitial volume is created closed between the inner and outer shells; and
    a heating unit positioned in the interstitial space, the heating unit configured to transfer heat energy to fuel stored within the inner shell.

2. The fuel tank defined in claim 1, wherein the interstitial volume is filled with a gas.

3. The fuel tank defined in claim 1, wherein the interstitial volume is filled with at least one thermally insulative material.

4. The fuel tank defined in claim 1, wherein the interstitial volume is evacuated.

5. The fuel tank defined in claim 1, wherein the interstitial volume is a thermally insulative barrier that also functions as one of the inner shell and the outer shell.

6. The fuel tank defined in claim 1, wherein the heating unit is a heat exchanger.

7. The fuel tank defined in claim 6, wherein the heat exchanger is mounted on an outer surface of the inner shell.

8. The fuel tank defined in claim 6, wherein the heat exchanger includes a control device that prevents coolant from reaching a portion of the heat exchanger.

9. The fuel tank defined in claim 8, wherein the control device is operatively associated with a temperature sensor positioned to detect the temperature of coolant in circulation.

10. The fuel tank defined in claim 8, further comprising a temperature sensor positioned to detect the temperature of fuel in the inner shell, the temperature sensor being operatively associated with the control device.

11. The fuel tank defined in claim 1, further comprising a temperature sensor positioned to detect the temperature of fuel in the inner shell.

12. The fuel tank defined in claim 1, wherein the heating unit comprises an electrical heating element.

13. The fuel tank defined in claim 12, wherein the heating element is configured to be connected to power through electrical conductors that extend outside the outer shell.

14. The fuel tank defined in claim 12, further comprising a thermostat operatively associated with the heating element.

15. The fuel tank defined in claim 12, wherein the heating element is mounted on an outer surface of the inner shell.

16. The fuel tank defined in claim 1, wherein the inner shell is thermally conductive.

17. The fuel tank defined in claim 1, further comprising a fuel volume sensor.

18. The fuel tank defined in claim 1, further comprising a fuel viscosity sensor.

19. A fuel tank for storing an alternate fuel and providing the fuel to an internal combustion engine, comprising:

an inner shell with an internal cavity designed to store fuel;

an outer shell configured and positioned relative to the inner shell such that an interstitial volume is created closed between the inner and outer shells;

a heating unit positioned in the interstitial space, the heating unit configured to transfer heat energy to fuel stored within the inner shell;

wherein the heating unit, inner shell and outer shell are mounted on a common mounting structure.

20. The fuel tank defined in claim 19, wherein the fuel tank includes at least one of a fuel level sensor, a fuel viscosity sensor, and a fuel temperature sensor mounted to the mounting structure.

21. The fuel tank defined in claim 19, wherein the fuel tank includes at least two of the fuel level sensor, a fuel viscosity sensor, and the fuel temperature sensor mounted to the mounting structure.

* * * * *